United States Patent [19]

Harigaya et al.

[11] Patent Number: 5,011,723
[45] Date of Patent: Apr. 30, 1991

[54] OPTICAL INFORMATION RECORDING MEDIUM

[75] Inventors: Makoto Harigaya, Hiratsuka; Yukio Ide, Mishima; Katsuyuki Yamada, Yokohama; Hiroko Iwasaki, Tokyo, all of Japan

[73] Assignee: Ricoh Company, Ltd., Tokyo, Japan

[21] Appl. No.: 382,186

[22] Filed: Jul. 20, 1989

[30] Foreign Application Priority Data

Jul. 20, 1988 [JP] Japan .................. 63-179186
Mar. 24, 1989 [JP] Japan .................. 1-70585
Jun. 6, 1989 [JP] Japan .................. 1-142086

[51] Int. Cl.$^5$ .............................. B32B 3/02
[52] U.S. Cl. .................. 428/64; 428/65; 428/412; 428/457; 428/913; 346/76 L; 346/135.1; 430/495; 430/945; 369/288
[58] Field of Search .................. 428/64, 65, 412, 457, 428/913; 346/76 L, 135.1; 430/495, 945; 369/288

[56] References Cited

PUBLICATIONS

Jap Abs. No. 75-14604W109, Siemen AG, 2-20-75.

*Primary Examiner*—Patrick J. Ryan
*Attorney, Agent, or Firm*—Oblon, Spivak, McClelland, Maier & Neustadt

[57] ABSTRACT

A phase-change type optical information recording medium is disclosed, which medium comprises a substrate and a recording layer formed thereon. The recording layer comprises a phase-transition type compound consisting of 4 to 6 elements, having a chalcopyrite structure, represented by the following formula (I):

$$X \cdot Y \cdot Z_2 \qquad (I)$$

wherein X represents one or two elements selected from the group consisting of elements belonging to the groups Ib and IIb in a periodic table; Y represents one or two elements selected from the group consisting of elements belonging to the groups IIIb, IVb and Vb in the periodic table; and Z represents one or two elements selected from the group consisting of elements belonging to the groups Vb and VIb in the periodic table.

9 Claims, No Drawings

OPTICAL INFORMATION RECORDING MEDIUM

BACKGROUND OF THE INVENTION

1. Field of the Invention

The present invention relates to a phase-change type optical information recording medium, more specifically an optical information recording medium which can record, read, and overwrite the information by utilizing the phase transition characteristics of the recording layer thereof.

2. Discussion of Background

There is conventionally known a phase-change type optical information recording medium as one of the optical memory media which can record, read and erase information by means of the irradiation of electromagnetic wave, in particular, laser beam. The phase-change type optical recording medium has the capabilities to record, read and erase information by utilizing the phase transition of a recording layer thereof, for example, from a crystalline phase to an amorphous phase, or from a crystalline phase to a crystalline phase. The above-mentioned phase-change type optical information recording medium has the advantages in that it makes it possible to overwrite the information by the irradiation of a single beam, which is considered to be difficult for the conventional magnetoptic memory media, and the optical system of a driving device for the recording medium becomes simple. Therefore, the research and development has been recently conducted in the field of such a phase-change type optical information recording medium.

As disclosed in U.S. Pat. No. 3,530,441, chalcogen type alloy materials for the recording medium such as Ge-Te, Ge-Te-Sb, Ge-Te-S, Ge-Se-S, Ge-Se-Sb, Ge-As-Se, In-Te, Se-Te and Se-As are conventionally employed. Further, for the purpose of improving the stability of the recording medium and accelerating the crystallization of the recording layer thereof, there are proposed more improved materials, for example, Ge-Te-Au in the Japanese Laid-Open Patent Application 61-219892, Ge-Te-Sn-Au in the Japanese Laid-Open Patent Application 61-270190 and Ge-Te-Pd in the Japanese Laid-Open Patent Application 62-19490. In addition, there is proposed a material of Ge-Te-Se-Sb with a specific elemental composition ratio in the Japanese Laid-Open Patent Application 62-73438 to maintain the performance of the recording medium after the recording and erasing operation are repeated.

However, the above-mentioned conventional phase-change type optical information recording media do not satisfy all the requirements. There is demanded a phase-change type optical information recording medium, in particular, with excellent recording and erasing sensitivity, which can completely erase the previous information in the course of the overwrite operation to keep the erasing ratio, and has a long life of recorded and not recorded areas thereof.

SUMMARY OF THE INVENTION

It is therefore an object of the present invention to provide a phase-change type optical information recording medium with excellent recording and erasing sensitivity and stability in recorded areas, which medium can perform the erasing operation rapidly and the overwrite operation completely.

The object of the present invention can be attained by a phase-change type optical information recording medium comprising a substrate and a recording layer formed thereon, which recording layer comprises a phase-transition type compound consisting of 4 to 6 elements, having a chalcopyrite structure, represented by the following formula (I):

$$X \cdot Y \cdot Z_2 \tag{I}$$

wherein X represents one or two elements selected from the group consisting of elements belonging to the groups Ib and IIb in a periodic table; Y represents one or two elements selected from the group consisting of elements belonging to the groups IIIb, IVb and Vb in the periodic table; and Z represents one or two elements selected from the group consisting of elements belonging to the groups Vb and VIb in the periodic table. The above-mentioned phase-transition type compound for use in the optical information recording medium has a chalcopyrite structure, or the like which is derived from the chalcopyrite structure, for example, by placing a vacancy at a lattice point where a cation is expected to be, or by losing the regularity of two cations in a crystal.

The object of the present invention can also be attained by a phase-change type optical information recording medium comprising a substrate and a recording layer formed thereon, which recording layer comprises the above-mentioned phase-transition type compound represented by the formula (I), and further comprising an element selected from the group VIIb in the periodic table.

DESCRIPTION OF THE PREFERRED EMBODIMENTS

The phase-change type optical information recording medium according to the present invention comprises a recording layer comprising the compound represented by the above-mentioned formula (I):

$$X \cdot Y \cdot Z_2 \tag{I}$$

wherein X represents one or two elements selected from the group consisting of elements belonging to the groups Ib and IIb in a periodic table; Y represents one or two elements selected from the group consisting of elements belonging to the groups IIIb, IVb and Vb in the periodic table; and Z represents one or two elements selected from the group consisting of elements belonging to the groups Vb and VIb in the periodic table.

Examples of the combination to form the above-mentioned compounds for use in the optical recording medium are as follows:

[Compounds consisting of 4 elements]

$I \cdot (III_{1-y}III'_y) \cdot VI_2, \ (II_{1-x}II'_x) \cdot IV \cdot V_2,$ $II \cdot (IV_{1-y}IV'_y) \cdot V_2, \ II \cdot IV \cdot (V_{1-z}V'_z)_2,$ $(I_{1-x}II_x) \cdot III \cdot VI_2, \ (I_{1-x}II_x) \cdot IV \cdot V_2,$ $I \cdot (III_{1-y}IV_y) \cdot VI_2, \ II \cdot (III_{1-y}IV_y) \cdot V_2,$ $I \cdot III \cdot (V_{1-z}VI_z)_2, \ II \cdot IV \cdot (V_{1-z}VI_z)_2,$ and $I \cdot (III_{1-y}V_y) \cdot VI_2.$ wherein I, II, III, VI, V and VI represents an element of the group Ib, IIb, IIIb, VIb, Vb and VIb, respectively in the periodic table. II', III', IV' and V' each represents a different element from the II, III, IV and V in the same group. $0<x<1$, $0<y<1$, and $0<z<1$.

[Compounds consisting of 5 elements]

$(I_{1-x}I'_x)\cdot(III_{1-y}III'_y)\cdot VI_2$, $I_x\cdot(III_{1-y}III'_y)\cdot(VI_{1-z}VI'_z)_2$, $(II_{1-x}II'_x)\cdot(IV_{1-y}IV'_y)\cdot V_2$, $(II_{1-x}II'_x)\cdot IV\cdot(V_{1-z}V'_z)_2$, $II\cdot(IV_{1-y}IV'_y)\cdot(V_{1-z}V'_z)_2$, $(I_{1-x}II_x)\cdot(III_{1-y}III'_y)\cdot VI_2$, $(I_{1-x}II_x)\cdot III\cdot(VI_zVI'_z)_2$, $(I_{1-x}II_x)\cdot(III_{1-y}IV_y)\cdot VI_2$, $(I_{1-x}II_x)\cdot(IV_{1-y}IV'_y)\cdot V_2$, $II\cdot(III_{1-y}IV_y)(V_{1-z}V'_z)_2$, $II\cdot(III_{1-y}IV_y)(V_{1-z}VI_z)_2$, $(I_{1-x}I'_x)\cdot(III_{1-y}V_y)\cdot VI_2$,
and $I_x\cdot(III_{1-y}V_y)\cdot(VI_{1-z}VI'_z)_2$.

wherein I, II, II', III, III', IV, IV', V, V',VI, VI', x, y, and z are the same as previously defined.

[Compounds consisting of 6 elements]

$(I_{1-x}I'_x)\cdot(III_{1-y}III'_y)\cdot(VI_{1-z}VI'_z)_2$, $(II_{1-x}II'_x)\cdot(IV_{1-y}IV'_y)\cdot(V_{1-z}V'_z)_2$, $(I_{1-x}II_x)\cdot(III_{1-y}III'_y)\cdot(VI_{1-z}VI'_z)_2$, $(I_{1-x}II_x)\cdot(IV_{1-y}IV'_y)\cdot(V_{1-z}V'_z)_2$, $(I_{1-x}I'_x)\cdot(III_{1-y}\ IV_y)\cdot(VI_{1-z}VI'_z)_2$, $I_{1-x}I'_x)\cdot(III_{1-y}III'_y)\cdot(V_{1-z}VI_z)_2$, $(II_{1-x}II'_x)\cdot(IV_{1-y}IV_y)\cdot(V_{1-z}V_z)_2$, $(II_{1-x}I'_x)\cdot(IV_{1-y}IV'_y)\cdot(V_{1-z}VI_z)_2$, $(II_{1-x}II'_x)\cdot(III_{1-y}IV_y)\cdot(V_{1-z}VI_z)_2$, $(I_{1-x}II_x)\cdot(III_{1-y}IV_y)\cdot(V_{1-z}VI_z)_2$, and $(I_{1-x}I'_x)\cdot(III_{1-y}V_y)\cdot(VI_{1-z}VI'_z)_2$, wherein I, II, II', III, III', IV, IV', V, V',VI, VI', x, y, and z are the same as previously defined.

It is possible to freely change the melting point, crystallization point, activation energy for crystallization, and optical constants of the compound of the formula (I) by replacing the elements represented by X, Y and Z and varying the elemental composition ratio of the compound. In the present invention, the phase-transition type compounds of the formula (I), having the chalcopyrite structure, such as Ib·IIIb·VIb$_2$ compound and IIb·IVb·Vb$_2$ compound have their own melting point, about from 500 to 800° C., and their own energy gap, which can effectively absorb the GaAl semiconductor laser (As-type) widely used in the optical recording field. Accordingly, the optical recording medium using the above-mentioned compound is allowed to record information with more improved recording sensitivity and erase information more quickly than conventional ones consisting of three elements.

According to the present invention, since the compound for the recording layer of the optical recording medium consists of 4 to 6 elements, the physical properties of the compound can be controlled by the combination of the above elements. Therefore the above-mentioned compounds for the recording layer for use in the present invention can realize an optical recording medium free from the conventional shortcomings.

When the above-mentioned compound of the formula (I) for use in the present invention is employed for the recording layer of the optical recording medium, the phase-transition from a crystalline phase to a crystalline phase is available as well as the phase-transition from an amorphous phase to a crystalline phase, according to the film-forming conditions.

Examples of the phase-transition type compounds for the recording layer of the optical recording medium according to the present invention are as follows:

$Ag\cdot(In_{1-x}Ga_x)\cdot Te_2$, $Ag\cdot(In_{1-x}Al_x)\cdot Te_2$, $Ag\cdot(Ga_{1-x}Al_x)\cdot Te_2$, $Ag\cdot(In_{1-x}Sb_x)\cdot Te_2$,
$Ag\cdot(Ga_{1-x}Sb_x)\cdot Te_2$, $Ag\cdot(Al_{1-x}Sb_x)\cdot Te_2$, $Ag\cdot(In_{1-x}Bi_x)\cdot Te_2$,
$Ag\cdot(Ga_{1-x}Bi_x)\cdot Te_2$, $Ag\cdot(Al_{1-x}Bi_x)\cdot Te_2$, $Ag\cdot(In_{1-x}Ga_x)\cdot Se_2$,
$Ag\cdot(In_{1-x}Sb_x)\cdot Se_2$, $Ag\cdot(Ga_{1-x}Sb_x)\cdot Se_2$, $Ag\cdot(In_{1-x}Bi_x)\cdot Se_2$,
$Cu\cdot(In_{1-x}Ga_x)\cdot Te_2$, $Cu\cdot(In_{1-x}Sb_x)\cdot Te_2$, $Cu\cdot(In_{1-x}Bi_x)\cdot Te_2$,
$Cu\cdot(In_{1-x}Ga_x)\cdot Se_2$, $Cu\cdot(In_{1-x}Sb_x)\cdot Se_2$, $Zn\cdot(Sn_{1-y}Ge_y)\cdot Sb_2$,
$(Zn_{1-x}Cd_x)\cdot S_n\cdot Sb_2$, $Zn\cdot Sn\cdot(Sb_{1-z}P_z)_x$, $(Ag_{1-x}Cu_x)\cdot(In_{1-y}Ga_y)\cdot Te_2$, $(Ag_{1-x}Cu_x)\cdot(In_{1-y}Al_y)\cdot Te_2$,
$(Ag_{1-x}Cu_x)\cdot(In_{1-y}Sb_y)\cdot Te_2$, $(Ag_{1-x}CU_x)\cdot(Ga_{1-y}Sb_y)\cdot Te_2$,
$Ag\cdot(In_{1-y}Ga_y)\cdot(Se_{1-z}Te_z)_2$, $Ag\cdot(In_{1-y}Sb_y)\cdot(Se_{1-z}Te_z)_2$,
$(Zn_{1-x}Cd_x)\cdot(Sn_{1-y}Ge_y)\cdot Sb_2$, $(Zn_{1-x}Cd_x)\cdot Sn\cdot(Sb_{1-z}P_z)_2$,
$Zn\cdot(Sn_{1-y}Ga_y)\cdot(Sb_{1-z}P_z)_2$, $(Ag_{1-x}Zn_x)\cdot(In_{1-y}Ga_y)\cdot Te_2$,
$(Ag_{1-x}Zn_x)\cdot In\cdot(Se_{1-z}Te_z)_2$, $(Ag_{1-x}Zn_x)\cdot(Sn_{1-y}Ge_y)\cdot Sb_2$,
$Zn\cdot(In_{1-y}Sn_y)\cdot(Sb_{1-z}P_z)_2$, $(Ag_{1-x}Cu_x)\cdot(In_{1-y}Ga_y)\cdot(Se_{1-z}Te_z)_2$, $Ag_{1-x}Cu_x)\cdot(In_{1-y}Sb_y)\cdot(Se_{1-z}Te_z)_2$, $(Zn_{1-x}Cd_x)\cdot(Sn_{1-y}Ge_y)\cdot(Sb_{1-z}P_z)_2$, $(Ag_{1-x}Zn_x)\cdot(In_{1-y}Ga_y)\cdot(Se_{1-z}Te_z)_2$, $(Ag_{1-x}Zn_x)\cdot(Sn_{1-y}Ge_y)\cdot(Sb_{1-z}P_z)_2$, $(Ag_{1-x}Cu_x)\cdot(In_{1-y}Sn_y)\cdot(Se_{1-z}Te_z)_2$, $(Ag_{1-x}Cu_x)\cdot(In_{1-y}Ga_y)\cdot(Sb_{1-z}Te_z)_2$, $(Zn_{1-x}Cd_x)\cdot(In_{1-y}Sn_y)\cdot(Sb_{1-z}P_z)_2,$ $(Zn_{1-x}Cd_x)\cdot(Sn_{1-y}Ge_y)\cdot(Sb_{1-z}Te_z)_2,$ $(Zn_{1-x}Cd_x)\cdot(In_{1-y}Sn_y)\cdot(Sb_{1-z}Te_z)_2,$ and
$(Ag_{1-x}Zn_x)\cdot(In_{1-y}Sn_y)\cdot(Sb_{1-z}Te_z)_2.$ In addition, elements belonging to the group VIIb in the periodical table may be further added to the above-listed compounds to improve the characteristics of the recording layer, in particular, the sensitivity of the recording layer and rapid crystallization thereof. The representative example is $Ag\cdot(In_{1-y}Ga_y)\cdot Te_2\cdot Cl$.

More specifically, when the preferable Ib·IIIb·VIb$_2$ compound having the formula (I) for use in the present invention is employed, one or two elements are respectively selected from the groups Ib, IIIb and VIb to form a compound consisting of at least four elements. Alternatively, a mixed crystal may be formed together with the Ib·Vb·VIb$_2$ compound or the IIb·IVb·Vb$_2$ compound. When the preferable Ib·Vb·VIb$_2$ compound having the formula (I) for use in the present invention is employed, one or two elements are respectively selected from the groups Ib, Vb and VIb to form a compound consisting of at least four elements. Alternatively, a mixed crystal may be formed together with the Ib·IIIb·VIb$_2$ compound. When the preferable IIb·IVb·Vb$_2$ compound having the formula (I) for use in the present invention is employed, one or two elements are respectively selected from the groups IIb, IVb and Vb to form a compound consisting of at least four elements. Alternatively, a mixed crystal may be formed together with the Ib·IIIb·VIb$_2$ compound. In this case, the mixed crystal can be formed by only the Ib·IIIb·VIb$_2$ compound, having the same chalcopyrite structure.

Examples of the substrate of the optical recording medium according to the present invention are glass, polymethyl methacrylate and polycarbonate.

When the optical recording medium according to the present invention is manufactured, it is recommendable to prepare a target with a predetermined elemental composition ratio and form a film on the substrate by sputtering. A chip of a single element may be used to correct the discrepancy of elemental composition ratio of the film.

It is preferable that the thickness of the recording layer of the optical recording medium be in the range of 100 to 1500 Å, more preferably in the range of 200 to 1000 Å. Within the aforementioned range, the optimal thickness of the recording layer may be designed, with the optical characteristics of the substrate and a protective layer formed on the recording layer taken into consideration.

The state of the recording layer is determined by the substrate temperature in the course of metal deposition of film-forming. When the sputtering is performed at room temperature, the recording layer becomes amorphous. When necessary, the phase of the recording layer can be changed into a crystalline phase by elevating the substrate temperature during the sputtering, or subjecting the recording layer to annealing.

According to the present invention, a protective layer can be formed on the recording layer. Heat-stable materials are suitable for the protective layer. For example, nitrides such as silicon nitride and aluminum nitride; and oxides such as silicon dioxide and titanium dioxide are employed. It is preferable that the thickness of the protective layer for use in the present invention be in the range of 300 to 1500 Å, more preferably about 1000 Å. Within the aforementioned range, the protective layer may be designed, with the optical characteristics of the recording layer taken into consideration. The protective layer is generally formed on the recording layer by the sputtering process, just like in the case of the recording layer.

Other features of this invention will become apparent in the course of the following description of exemplary embodiments, which are given for illustration of the invention and are not intended to be limiting thereof.

EXAMPLE 1

A target with the elemental composition ratio of $Ag_{25}(In_{10}Ga_{15})Te_{50}$ was prepared for sputtering. By use of the aforementioned target, a recording layer having a thickness of 1000 Å was formed by sputtering on a glass plate serving as a substrate, having a diameter of 130 mm and a thickness of 1.2 mm. On the thus formed recording layer, silicon nitride was deposited by the sputtering process, so that a protective layer with a thickness of 1000 Å was obtained.

The thus obtained recording layer was in an amorphous state. The recording layer was crystallized for initializing, whereby a phase-change type optical information recording medium No. 1 according to the present invention was obtained.

In the course of forming the recording layer, a test piece of the above-mentioned recording layer was formed on a slide glass to examine its various characteristics. The optical characteristics and thermal characteristics of the recording layer were respectively assessed by a spectrophotometer and a differential scanning calorimeter (DSC).

The melting point of the recording layer of the optical recording medium No. 1 according to the present invention was about 700° C and the crystallization point thereof was about 170° C. The change in the reflectance of the amorphous phase and the crystalline phase of the recording layer was about 18% when the recording layer was exposed to a spectrum having a wavelength of 780 nm.

After the recording layer of the optical recording medium was subjected to crystallization, it was exposed to the semiconductor laser beam of 3 MHz, with rotating at a rotational speed of 1800 rpm. The semiconductor laser beam employed has an oscillating wavelength $\lambda$ of 780 nm, with the beam diameter narrowed down to about 1 $\mu$m. Recording, reading and erasing of the information were performed under the following output conditions:

For recording:
minimum output power: 12 mW
For reading
output power : 2 mW
For erasing
output power: 6 mW
minimum Then, the overwrite operation was carried out by exposing the recording medium to the semiconductor laser beam of 2 MHz. After the overwrite operation, the C/N ratio was 50 dB, which was the same as the value obtained at the initial recording. The erasing ratio was 30 db, but it was regarded to be no problem for the practical use.

After 10,000 times of repetition of the recording and erasing operation, degradation of the signal level was hardly observed.

EXAMPLE 2

Example 1 was repeated except that the target with the elemental composition ratio of $Ag_{25}(In_{10}Ga_{15})Te_{50}$ employed in Example 1 was replaced by a target with the elemental composition ratio of $Ag_{25}(In_{15}Sb_{10})$, whereby a phasechange type optical information recording medium No. 2 according to the present invention was obtained.

In the course of forming the recording layer, a test piece of the above-mentioned recording layer was formed on a slide glass to examine its various characteristics. The optical characteristics and thermal characteristics of the recording layer were respectively assessed by a spectrophotometer and a differential scanning calorimeter (DSC).

The melting point of the recording layer of the optical recording medium No. 2 according to the present invention was about 610° C. and the crystallization point thereof was about 190° C. The change in the reflectance of the amorphous phase and the crystalline phase of the recording layer was about 22% when the recording layer was exposed to a spectrum having a wavelength of 780 nm. Since the above-mentioned factors of the recording layer vary depending on the composition ratio of the elements of In and Sb contained in the compound for use in the recording layer, the recording and erasing sensitivity, and the life of recorded areas are rather freely adjusted for the purposes.

After the recording layer of the optical recording medium was subjected to crystallization, it was exposed to the semiconductor laser beam of 3 MHz, with rotating at a rotational speed of 1800 rpm. The semiconductor laser beam employed has an oscillating wavelength $\lambda$ of 780 nm, with the beam diameter narrowed down to about 1 $\mu$m. Recording, reading and erasing of the information were performed under the following output conditions:

For recording:
minimum output power: 11 mW
For reading
output power : 2 mW
For erasing
minimum output power: 7 mW Then, the overwrite operation was carried out by exposing the recording medium to the semiconductor laser beam of 2 MHz. After the overwrite operation, the C/N ratio was 52 dB, which was hardly changed as compared with the C/N ratio of 53 dB at the initial recording. The erasing ratio was 31 db, but it was regarded to be no problem for the practical use.

After 10,000 times of repetition of the recording and erasing operation, degradation of the signal level was hardly observed.

EXAMPLE 3

Example 1 was repeated except that the target with the elemental composition ratio of $Ag_{25}(In_{10}Ga_{15})Te_{50}$ employed in Example 1 was replaced by a target with the elemental composition ratio of $(Ag_{20}Cu_5)(In_{15}Ga_{10})Te_{50}$, whereby a phase-change type optical information recording medium No. 3 according to the present invention was obtained.

In the course of forming the recording layer, a test piece of the above-mentioned recording layer was formed on a slide glass to examine its various characteristics. The optical characteristics and thermal characteristics of the recording layer were respectively assessed by a spectrophotometer and a differential scanning calorimeter (DSC).

The melting point of the recording layer of the optical recording medium No. 3 according to the present invention was about 730° C. and the crystallization point thereof was about 190° C. The change in the reflectance of the amorphous phase and the crystalline phase of the recording layer was about 17% when the recording layer was exposed to a spectrum having a wavelength of 780 nm.

After the recording layer of the optical recording medium was subjected to crystallization, it was exposed to the semiconductor laser beam of 3 MHz, with rotating at a employed has an oscillating wavelength $\lambda$ of 780 nm, with the beam diameter narrowed down to about 1 $\mu$m. Recording, reading and erasing of the information were performed under the following output conditions:

For recording:
minimum output power: 13 mW
For reading
output power : 2 mW
For erasing
minimum output power: 7 mW Then, the overwrite operation was carried out by exposing the recording medium to the semiconductor laser beam of 2 MHz. After the overwrite operation, the C/N ratio was 49 dB, which was hardly changed as compared with the C/N ratio of 50 dB at the initial recording and the erasing ratio was 30 db, but it was regarded to be no problem for the practical use.

After 10,000 times of repetition of the recording and erasing operation, degradation of the signal level was hardly observed.

EXAMPLE 4

Example 1 was repeated except that the target with the elemental composition ratio of $Ag_{25}(In_{10}Ga_{15})Te_{50}$ employed in Example 1 was replaced by a target with the elemental composition ratio of $(Ag_{15}Zn_{10})(In Sb_{20}Te_{30})$, whereby a phase-change type optical information recording medium No. 4 according to the present invention was obtained.

In the course of forming the recording layer, a test piece of the above-mentioned recording layer was formed on a slide glass to examine its various characteristics. The optical characteristics and thermal characteristics of the recording layer were respectively assessed by a spectrophotometer and a differential scanning calorimeter (DSC).

The melting point of the recording layer of the optical recording medium No. 4 according to the present invention was about 590° C. and the crystallization point thereof was about 150° C. The change in the reflectance of the amorphous phase and the crystalline phase of the recording layer was about 20% when the recording layer was exposed to a spectrum having a wavelength of 780 nm.

After the recording layer of the optical recording medium was subjected to crystallization, it was exposed to the semiconductor laser beam of 3 MHz, with rotating at a rotational speed of 1800 rpm. The semiconductor laser beam employed has an oscillating wavelength $\lambda$ of 780 nm, with the beam diameter narrowed down to about 1 $\mu$m. Recording, reading and erasing of the information were performed under the following output conditions:

For recording:
minimum output power: 9 mW
For reading
output power : 2 mW
For erasing
minimum output power: 5 mW Then, the overwrite operation was carried out by exposing the recording medium to the semiconductor laser beam of 2 MHz. After the overwrite operation, the C/N ratio was 49 dB, which was hardly changed as compared with the C/N ratio of 51 dB at the initial recording, and the erasing ratio was 30 db, but it was regarded to be no problem for the practical use.

After 10,000 times of repetition of the recording and erasing operation, degradation of the signal level was hardly observed.

EXAMPLE 5

Example 1 was repeated except that the target with the elemental composition ratio of $Ag_{25}(In_{10}Ga_{15})Te_{50}$ employed in Example 1 was replaced by a target with the elemental composition ratio of $Ag_{25}(In_{15}Sb_{10})(Se_{10}Te_{40})$, whereby a phase-change type optical information recording medium No. 5 according to the present invention was obtained.

In the course of forming the recording layer, a test piece of the above-mentioned recording layer was formed on a slide glass to examine its various characteristics. The optical characteristics and thermal characteristics of the recording layer were respectively assessed by a spectrophotometer and a differential scanning calorimeter (DSC).

The melting point of the recording layer of the optical recording medium No. 5 according to the present invention was about 630° C. and the crystallization point thereof was about 160° C. The change in the reflectance of the amorphous phase and the crystalline phase of the recording layer was about 20% when the recording layer was exposed to a spectrum having a wavelength of 780 nm.

After the recording layer of the optical recording medium was subjected to crystallization, it was exposed to the semiconductor laser beam of 3 MHz, with rotating at a rotational speed of 1800 rpm. The semiconductor laser beam employed has an oscillating wavelength λ of 780 nm, with the beam diameter narrowed down to about 1 μm. Recording, reading and erasing of the information were performed under the following output conditions:

For recording:
minimum output power: 11 mW
For reading
output power : 2 mW
For erasing
minimum output power: 6 mW Then, the overwrite operation was carried out by exposing the recording medium to the semiconductor laser beam of 2 MHz. After the overwrite operation, the C/N ratio was 51 dB, which was hardly changed as compared with the C/N ratio of 52 dB at the initial recording, and the erasing ratio was 31 db, but it was regarded to be no problem for the practical use.

After 10,000 times of repetition of the recording and erasing operation, degradation of the signal level was hardly observed.

EXAMPLE 6

Example 1 was repeated except that the target with the elemental composition ratio of $Ag_{25}(In_{10}Ga_{15})Te_{50}$ employed in Example 1 was replaced by a target with the elemental composition ratio of $(Zn_{15}Cd_{10})\cdot Sn_{25}\cdot(Sb_{30}P_{20})$, whereby a phase-change type optical information recording medium No. 6 according to the present invention was obtained.

In the course of forming the recording layer, a test piece of the above-mentioned recording layer was formed on a slide glass to examine its various characteristics. The optical characteristics and thermal characteristics of the recording layer were respectively assessed by a spectrophotometer and a differential scanning calorimeter (DSC).

The melting point of the recording layer of the optical recording medium No. 6 according to the present invention was about 510° C. and the crystallization point thereof was about 160° C. The change in the reflectance of the amorphous phase and the crystalline phase of the recording layer was about 18% when the recording layer was exposed to a spectrum having a wavelength of 780 nm. Since the above-mentioned factors of the recording layer vary depending on the composition ratio of the elements of Zn and Cd or Sb and P contained in the compound for use in the recording layer, the recording and erasing sensitivity, and the life of recorded areas are rather freely adjusted for the purposes.

After the recording layer of the optical recording medium was subjected to crystallization, it was exposed to the semiconductor laser beam of 3 MHz, with rotating at a rotational speed of 1800 rpm. The semiconductor laser beam employed has an oscillating wavelength λ of 780 nm, with the beam diameter narrowed down to about 1 μm. Recording, reading and erasing of the information were performed under the following output conditions:

For recording:
minimum output power: 8 mW
For reading
output power : 2 mW
For erasing
minimum output power 5 mW Then, the overwrite operation was carried out by exposing the recording medium to the semiconductor laser beam of 2 MHz. After the overwrite operation, the C/N ratio was 50 dB, which was hardly changed as compared with the C/N ratio of 51 dB at the initial recording, and the erasing ratio was 31 db, but it was regarded to be no problem for the practical use.

After 10,000 times of repetition of the recording and erasing operation, degradation of the signal level was hardly observed.

EXAMPLE 7

Example 1 was repeated except that the target with the elemental composition ratio of $Ag_{25}(In_{10}Ga_{15})Te_{50}$ employed in Example 1 was replaced by a target with the elemental composition ratio of $Zn_{25}(In_{10}Sn_{15})(Sb_{1.5}Te_{35})$, whereby a phase-change type optical information recording medium No. 7 according to the present invention was obtained.

In the course of forming the recording layer, a test piece of the above-mentioned recording layer was formed on a slide glass to examine its various characteristics. The optical characteristics and thermal characteristics of the recording layer were respectively assessed by a spectrophotometer and a differential scanning calorimeter (DSC).

The melting point of the recording layer of the optical recording medium No. 7 according to the present invention was about 530° C. and the crystallization point thereof was about 135° C. The change in the reflectance of the amorphous phase and the crystalline phase of the recording layer was about 18% when the recording layer was exposed to a spectrum having a wavelength of 780 nm.

After the recording layer of the optical recording medium was subjected to crystallization, it was exposed to the semiconductor laser beam of 3 MHz, with rotating at a rotational speed of 1800 rpm. The semiconductor laser beam employed has an oscillating wavelength λ of 780 nm, with the beam diameter narrowed down to about 1 μm. Recording, reading and erasing of the information were performed under the following output conditions:

For recording:
minimum output power: 9 mW
For reading
output power : 2 mW
For erasing
minimum output power: 5 mW Then, the overwrite operation was carried out by exposing the recording medium to the semiconductor laser beam of 2 MHz. After the overwrite operation, the C/N ratio was 50 dB, which was hardly changed as compared with the C/N ratio of 52 dB at the initial recording, and the erasing ratio was 30 db, but it was regarded to be no problem for the practical use.

After 10,000 times of repetition of the recording and erasing operation, degradation of the signal level was hardly observed.

EXAMPLE 8

Example 1 was repeated except that the target with the elemental composition ratio of $Ag_{25}(iN_{10}gA_{15})Te_{50}$ employed in Example 1 was replaced by a target with the elemental composition ratio of $Ag_{25}(In_{10}Ga_{15})Te_{50}$ with addition of 100 ppm of Cl, whereby a phase-change type optical information recording medium No. 8 according to the present invention was obtained.

In the course of forming the recording layer, a test piece of the above-mentioned recording layer was formed on a slide glass to examine its various characteristics. The optical characteristics and thermal characteristics of the recording layer were respectively assessed by a spectrophotometer and a differential scanning calorimeter (DSC).

The melting point of the recording layer of the optical recording medium No. 8 according to the present invention was about 660° C. and the crystallization point thereof was about 140° C. The change in the reflectance of the amorphous phase and the crystalline phase of the recording layer was about 20% when the recording layer was exposed to a spectrum having a wavelength of 780 nm.

After the recording layer of the optical recording medium was subjected to crystallization, it was exposed to the semiconductor laser beam of 3 MHz, with rotating at a rotational speed of 1800 rpm. The semiconductor laser beam employed has an oscillating wavelength λ of 780 nm, with the beam diameter narrowed down to about 1 μm. Recording, reading and erasing of the information were performed under the following output conditions:

For recording:
minimum output power: 11 mW
For reading
output power : 2 mW
For erasing
minimum output power: 5 mW Then, the overwrite operation was carried out by exposing the recording medium to the semiconductor laser beam of 2 MHz. After the overwrite operation, the C/N ratio was 49 dB, which was hardly changed as compared with the C/N ratio of 50 dB at the initial recording, and the erasing ratio was 30 db, but it was regarded to be no problem for the practical use.

After 10,000 times of repetition of the recording and erasing operation, degradation of the signal level was hardly observed.

As obvious from the above-mentioned examples, the phase-change type optical information recording medium according to the present invention can realize the improved recording and erasing sensitivity, increased erasing ratio, and excellent repeatability.

What is claimed is:

1. A phase-change type optical information recording medium comprising a substrate and a recording layer formed thereon, which recording layer comprises a phase-transition type compound consisting of 4 elements, having a chalcopyrite structure, represented by the following formula (I):

$$X \cdot Y \cdot Z_2 \qquad (I)$$

wherein X represents one or two elements selected from the group consisting of elements belonging to the groups Ib and IIb in a periodic table; Y represents one or two elements selected from the group consisting of elements belonging to the groups IIIb, IVb, and Vb in a periodic table; and Z represents one or two elements selected from the group consisting of elements belonging to the groups Vb and VIb in a periodic table, which combination is selected from the group consisting of:

$I \cdot (III_{1-y} III'_y) \cdot VI_2$, $(II_{1-x} II'_x) \cdot IV \cdot V_2$, $II \cdot (IV_{1-y} IV'_y) \cdot V_2$, $II \cdot IV \cdot (V_{1-z} V'_z)_2$, $(I_{1-x} II_x) \cdot III \cdot IV_2$, $(I_{1-x} II_x) \cdot IV \cdot V_2$, $I \cdot (III_{1-y} IV_y) \cdot VI_2$, $II \cdot (III_{1-y} IV_y) \cdot V_2$, $I \cdot III \cdot (V_{1-z} VI_2)_2$, $II \cdot IV \cdot (V_{1-z} VI_2)_2$, and
$I \cdot III_{1-y} V_y) \cdot VI_2$;

wherein I, II, III, VI, V and VI each represents an element of the group Ib, IIb, IIIb, VIb, Vb and VIb, respectively in the periodic table; II', III', IV' AND v' each represents a different element from the II, III, IV and V in the same group; and $0<x<1$, $0<y<1$, and $0<z<1$.

2. The phase-change type optical information recording medium as claimed in claim 1, wherein said phase-transition type compound for use in said recording layer further contains an element selected from the group VIIb in the periodic table.

3. The phase-change type optical information recording medium as claimed in claim 1, wherein said recording layer has a thickness of 100 to 1,500 Å.

4. A phase-change type optical information recording medium comprising a substrate and a recording layer formed thereon, which recording layer comprises a phase-transition type compound consisting of 5 elements, having a chalcopyrite structure, represented by the following formula (I):

$$X \cdot Y \cdot Z_2 \quad (I)$$

wherein X represents one or two elements selected from the group consisting of elements belonging to the groups Ib and IIb in a periodic table; Y represents one or two elements selected for the group consisting of elements belonging to the groups IIIb, IVb, and Vb in a periodic table; and Z represents one or two elements selected for the group consisting of elements belonging to the groups Vb and VIb in a periodic table, which combination is selected from the group consisting of:

$(I_{1-x}I'_x) \cdot (III_{1-y}III'_y) \cdot VI_2$, $I_x(III_{1-y}III'_y) \cdot (VI_{1-z}VI'_z)_2$, $(I_x(III_{1-y}V_y) \cdot (VI_{1-z}VI'z)_2$, $(II_{1-x}II'_x) \cdot IV_{1-y}IV'_z)_2$, $(II_{1-x}II'_x) \cdot IV \cdot (V'_{1-z}V'_z)_2$, $II \cdot (IV_{1-y}IV'_y) \cdot (V_{1-z}V'_z)_2$, $(I_{1-x}II_x) \cdot (III_{1-y}III'_y) \cdot VI_2$, $(I_{1-x}II_x) \cdot III \cdot (VI_{1-z}VI'_z)_2$, $(I_{1-x}II_x) \cdot (III_{1-y}IV_y) \cdot VI_2$, $(I_{1-x}II_x) \cdot (IV_{1-y}IV'_y) \cdot V_2$, $II \cdot (III_{1-y}IV_y) \cdot (V_{1-z}V'_z)_2$, $II \cdot (III_{1-y}IV_y) \cdot (V_{1-z}VI_z)_2$, and
$(I_{1-x}I'_x) \cdot (III_{1-y}V_y) \cdot VI_2$;

wherein I, II, III, VI, V and VI each represents an element of the group Ib, IIb, IIIb, VIb, Vb and VIb, respectively in the periodic table; II', III', IV', V' and VI' each represents a different element from the I, II, III, IV, V and VI in the same group and $0<x<1$, $0<y<1$, and $0<z<1$.

5. The phase-change type optical information recording medium as claimed in claim 4, wherein said phase-transition type compound for use in said recording layer further contains an element selected from the group VIIb in the periodic table.

6. The phase-change type optical information recording medium as claimed in claim 4, wherein said recording layer has a thickness of 100 to 1,500 Å.

7. The phase-change type optical information recording medium comprising a substrate and a recording layer formed thereon, which recording layer comprises a phase-transition type compound consisting of 6 elements, having a chalcopyrite structure, represented by the following formula (I):

$$X \cdot Y \cdot Z_2 \quad (I)$$

wherein X represents one or two elements selected from the group consisting of elements belonging to the groups Ib and IIb in a periodic table; Y represents one or two elements selected from the group consisting of elements belonging to the groups IIIb, IVb, and Vb in a periodic table; and Z represents one or two elements selected from the group consisting of elements belonging to the groups Vb and VIb in a periodic table, which combination is selected from the group consisting of:

$(I_{1-x}I'_x) \cdot (III_{1-y}III'_y) \cdot (VI_{1-z}VI'_z)_2$,
$(I_{1-x}I'_x) \cdot (III_{1-y}V_y) \cdot (VI_{1-z}VI'_z)_2$,
$(II_{1-x}II'_x) \cdot (IV_{1-y}IV'_y) \cdot (V_{1-z}V'_z)_2$,
$(II_{1-x}II'_x) \cdot (III_{1-y}III'_y) \cdot (VI_{1-z}VI'_z)_2$,
$(I_{1-x}II_x) \cdot (IV_{1-y}IV'_y) \cdot (V_{1-z}V'_z)_2$,
$(I_{1-x}I_x) \cdot (III_{1-y}IV_y) \cdot (VI_{1-z}VI'_z)_2$,
$(I_{1-x}I'_x) \cdot (III_{1-y}III'_y) \cdot (V_{1-z}VI_z)_2$,
$(II_{1-x}II'_x) \cdot (III_{1-y}IV_y) \cdot (V_{1-z}V_z)_2$,
$(II_{1-x}II'_x) \cdot (IV_{1-y}IV'_y) \cdot (V_{1-z}VI_z)_2$,
$(II_{1-x}II'_x) \cdot (III_{1-y}IV_y) \cdot (V_{1-z}VI_z)_2$, and
$(I_{1-x}II_x) \cdot (III_{1-y}IV_y) \cdot (V_{1-z}VI_z)_2$;

wherein I, II, III, VI, V and VI each represents an element of the group Ib, IIb, IIIb, VIb, Vb and VIb, respectively in the periodic table; I', II', III', IV', V' and VI' each represents a different element from the I, II, III, IV, V and VI in the same group; and $0<x<1$, $0<y<1$, and $0<z<1$.

8. The phase-change type optical information recording medium as claimed in claim 7, wherein said phase-transition type compound for use in said recording layer further contains an element selected from the group VIIb in the periodic table.

9. The phase-change type optical information recording medium as claimed in claim 7, wherein said recording layer has a thickness of 100 to 1,500 Å.

* * * * *